(12) United States Patent
Lim

(10) Patent No.: US 12,332,687 B2
(45) Date of Patent: Jun. 17, 2025

(54) SUBSTRATE LOADING DEVICE AND SUBSTRATE LOADING METHOD

(71) Applicant: Samsung Display Co., Ltd., Yongin-Si (KR)

(72) Inventor: Heesung Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/741,778

(22) Filed: Jun. 13, 2024

(65) Prior Publication Data

US 2024/0419213 A1    Dec. 19, 2024

(30) Foreign Application Priority Data

Jun. 19, 2023  (KR) .................. 10-2023-0078439

(51) Int. Cl.
*G06F 1/16* (2006.01)
*G06F 1/18* (2006.01)

(52) U.S. Cl.
CPC ............ *G06F 1/1626* (2013.01); *G06F 1/181* (2013.01); *G06F 1/186* (2013.01)

(58) Field of Classification Search
None
See application file for complete search history.

(56) References Cited

U.S. PATENT DOCUMENTS 11,022,771 B2    6/2021    Solheid et al.

FOREIGN PATENT DOCUMENTS

| CN | 110775435 A | 2/2020 |
| CN | 214690990 U | 11/2021 |

*Primary Examiner* — Nicholas J Lee
(74) *Attorney, Agent, or Firm* — Innovation Counsel LLP

(57) ABSTRACT

Provided is a substrate loading device including a side surface fixing portion including side surface grooves into which first and second side surfaces, opposite to each other in a first direction, of a substrate are inserted, and extending in a second direction crossing the first direction; and a base fixing portion including a base groove into which a third side surface of the substrate, connecting the first side surface to the second side surface, is inserted. The base fixing portion includes at least one inclined surface defining the base groove. The inclined surface overlaps, on a plane, a central axis passing through centers of the side surface grooves and parallel to the first direction.

20 Claims, 14 Drawing Sheets

SUBSTRATE LOADING DEVICE AND SUBSTRATE LOADING METHOD

CROSS-REFERENCE TO RELATED APPLICATIONS

This U.S. non-provisional patent application claims priority under 35 U.S.C. § 119 of Korean Patent Application No. 10-2023-0078439, filed on Jun. 19, 2023, the entire contents of which are hereby incorporated by reference.

BACKGROUND

The present disclosure herein relates to a substrate loading device and a substrate loading method, and more particularly, to a substrate loading device with improved reliability and a substrate loading method.

Generally, a display device includes a display panel on which a plurality of elements are disposed. When a display panel is manufactured, a metal thin film, an inorganic layer, etc., for forming such elements are formed on a substrate.

A substrate processing system is used for forming the metal thin film, the inorganic layer, etc., on the substrate of the display panel. The substrate processing system includes a cassette which accommodates a substrate, a transfer device which transfers the substrate from the cassette, and a substrate processing device which receives the substrate from the transfer device and performs a substrate processing process for forming a metal thin film and an inorganic layer.

A cleaning process is performed, prior to proceeding to a following process, in order to remove contaminants occurring on a substrate surface during a previous process. The cleaning process is performed while a substrate is coupled to a fixing portion of a substrate loading device.

SUMMARY

The present disclosure provides a substrate loading device and a substrate loading method for preventing a defect of a substrate fixed to the substrate loading device.

An embodiment of the inventive concept provides a substrate loading device including: a side surface fixing portion including side surface grooves into which first and second side surfaces, opposite to each other in a first direction, of a substrate are inserted, and extending in a second direction crossing the first direction; and a base fixing portion including a base groove into which a third side surface of the substrate, connecting the first side surface to the second side surface, is inserted. The base fixing portion may include at least one inclined surface defining the base groove, and the inclined surface may overlap a central axis passing through centers of the side surface grooves and parallel to the first direction.

In an embodiment, the inclined surface may include first and second inclined surfaces facing each other.

In an embodiment, the base fixing portion may further include a bottom surface which connects the first inclined surface and the second inclined surface to each other.

In an embodiment, the bottom surface may have a curved shape recessed toward a recessed direction of the base groove.

In an embodiment, a gap between the first inclined surface and the second inclined surface may become smaller as a distance to the bottom surface becomes less.

In an embodiment, the central axis may not overlap the bottom surface on a plane.

In an embodiment, the third side surface of the substrate may be in contact with the bottom surface.

In an embodiment, a plurality of base grooves including the base groove may be provided, and the plurality of base grooves may be arranged along the second direction.

In an embodiment, a plurality of side surface fixing portions including the side surface fixing portion may be provided.

In an embodiment, the plurality of side surface fixing portions may include a first side surface fixing portion arranged toward the base fixing portion; and a second side surface fixing portion disposed between the first side surface fixing portion and the base fixing portion.

In an embodiment, the first side surface fixing portion may include first side surface grooves into which the first side surface and the second side surface of the substrate are respectively inserted, and the second side surface fixing portion may include second side surface grooves into which the first side surface and the second side surface of the substrate are respectively inserted.

In an embodiment, planar shapes of the first side surface grooves may differ from planar shapes of the second side surface grooves.

In an embodiment, planar sizes of the first side surface grooves may be greater than planar sizes of the second side surface grooves.

In an embodiment, the first side surface fixing portion, the second side surface fixing portion, and the base fixing portion may be disposed to be spaced apart from each other.

In an embodiment of the inventive concept, a substrate loading method includes: disposing a base fixing portion including a base groove having at least one inclined surface; disposing, on the base fixing portion, a side surface fixing portion including side surface grooves such that a central axis, passing through centers of the side surface grooves and parallel to a first direction, does not overlap the inclined surface; and inserting first and second side surfaces of a substrate into the side surface grooves by moving the substrate along a third direction perpendicular to the first direction, the first and second side surfaces being opposite to each other in the first direction; inserting, into the base groove, a third side surface of the substrate connecting the first side surface to the second side surface by moving the substrate along the third direction; and moving the base fixing portion in a second direction crossing a plane defined by the first and third directions such that the central axis overlaps the inclined surface on a plane.

In an embodiment, the base fixing portion may include a plurality of base grooves including the base groove, and a plurality of substrates including the substrate may be provided to correspond to the plurality of base grooves.

In an embodiment, the substrates may be respectively inserted into the plurality of base grooves arranged along the second direction.

In an embodiment, after moving the base fixing portion in the second direction, the substrates may be inclined in a direction opposite to the second direction.

In an embodiment, the side surface fixing portion and the base fixing portion may be spaced apart from each other in the third direction.

In an embodiment, a length of each of the substrates in the third direction may be greater than a distance by which the side surface fixing portion and the base fixing portion are spaced apart from each other in the third direction, and upper side portions of the substrates arranged on the side surface fixing portion may be inclined to a direction opposite to the second direction.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept.

DETAILED DESCRIPTION

Figure 1:
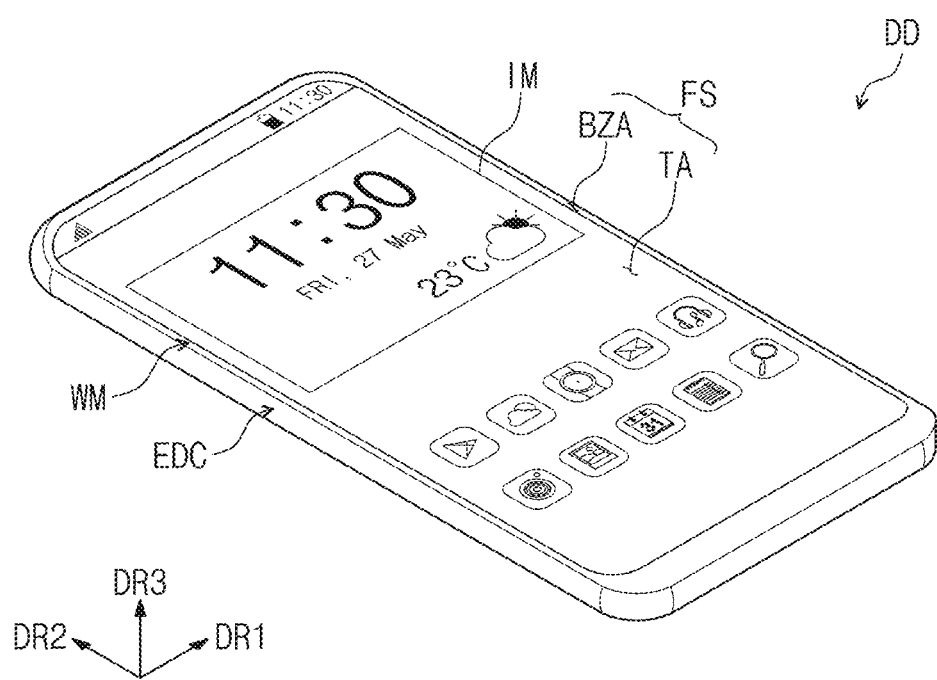
FIG. 1 is a perspective view of a display device according to an embodiment of the inventive concept.

The inventive concept may be implemented in various modifications and have various forms and specific embodiments are illustrated in the drawings and described in detail in the text. It is to be understood, however, that the embodiment of the inventive concept is not intended to be limited to the particular forms disclosed, but on the contrary, is intended to cover all modifications, equivalents, and alternatives falling within the spirit and scope of the inventive concept In this specification, it will be understood that when an element (or a region, a layer, a portion, or the like) is referred to as "being on", "connected to" or "coupled to" another element, it may be directly disposed on/connected/coupled to the other element, or intervening elements may be disposed therebetween.

Like reference numerals or symbols refer to like elements throughout. In the drawings, the thickness, the ratio, and the dimension of the elements are exaggerated for effective description of the technical contents.

The term "and/or" includes all combinations of one or more of the associated listed elements.

Although the terms first, second, etc. may be used to describe various elements, these elements should not be limited by these terms. These terms are only used to distinguish one element from another element. For example, a first element may be referred to as a second element, and similarly, a second element may also be referred to as a first element without departing from the scope of the inventive concept. The singular forms include the plural forms as well, unless the context clearly indicates otherwise.

The terms such as "below", "lower", "above", "upper" and the like, may be used herein for the description to describe one element's relationship to another element illustrated in the figures. It will be understood that the terms have a relative concept and are described on the basis of the orientation depicted in the figures.

Unless otherwise defined, all terms (including technical and scientific terms) used herein have the same meaning as commonly understood by one of ordinary skill in the art to which the present disclosure belongs. Also, terms, such as those defined in commonly used dictionaries, should be interpreted as having a meaning that is consistent with their meaning in the context of the relevant art and should not be interpreted in an idealized or overly formal sense unless expressly so defined herein.

It will be understood that the terms "include" or "have" and the like, specify the presence of stated features, integers, steps, operations, elements, components or combinations thereof, but do not preclude the presence or addition of one or more other features, integers, steps, operations, elements, components, or combinations thereof.

Hereinafter, embodiments of the inventive concept will be described with reference to the drawings.

Figure 2A:
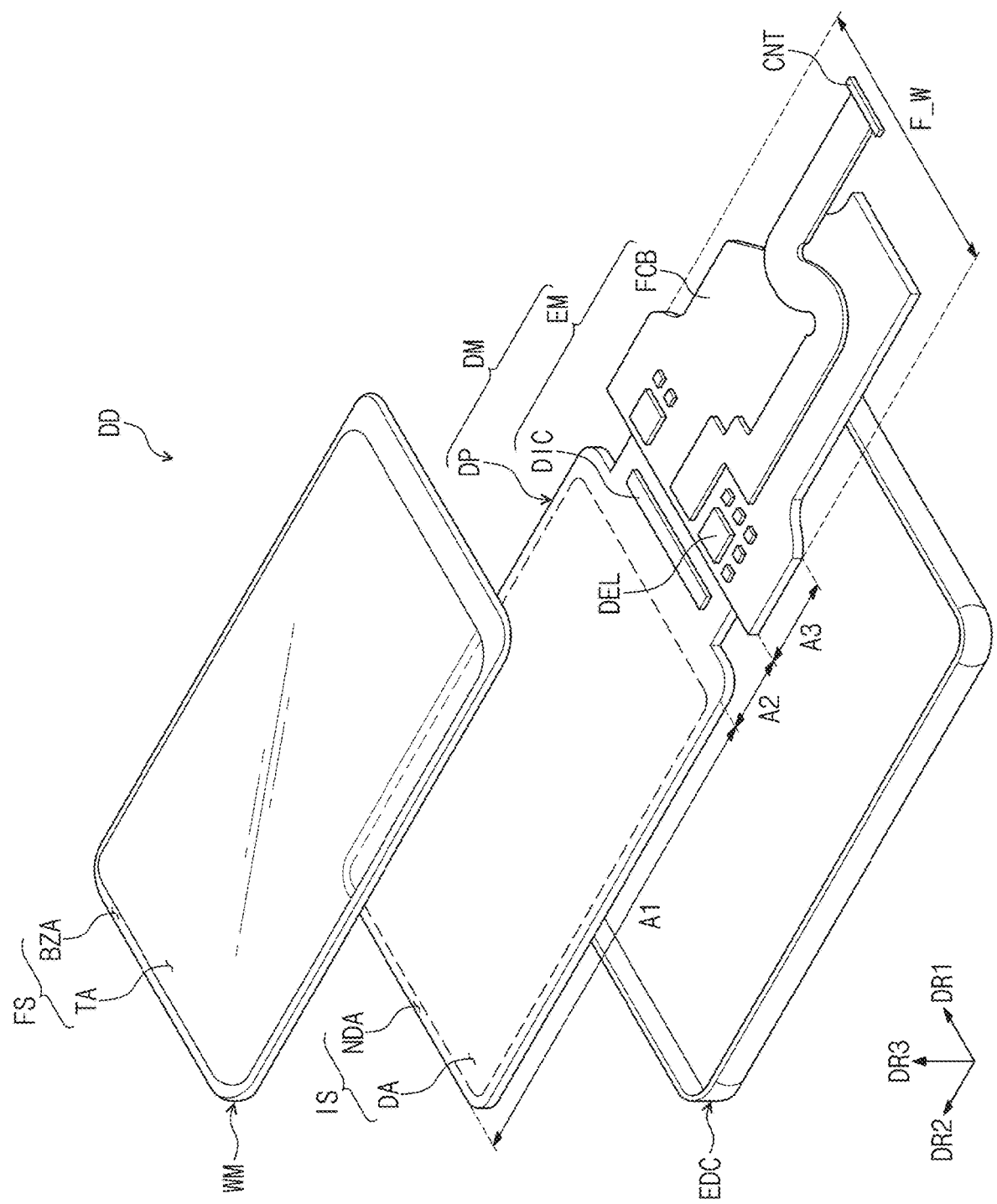
FIG. 2A is an exploded perspective view of a display device according to an embodiment of the inventive concept.
Figure 2B:
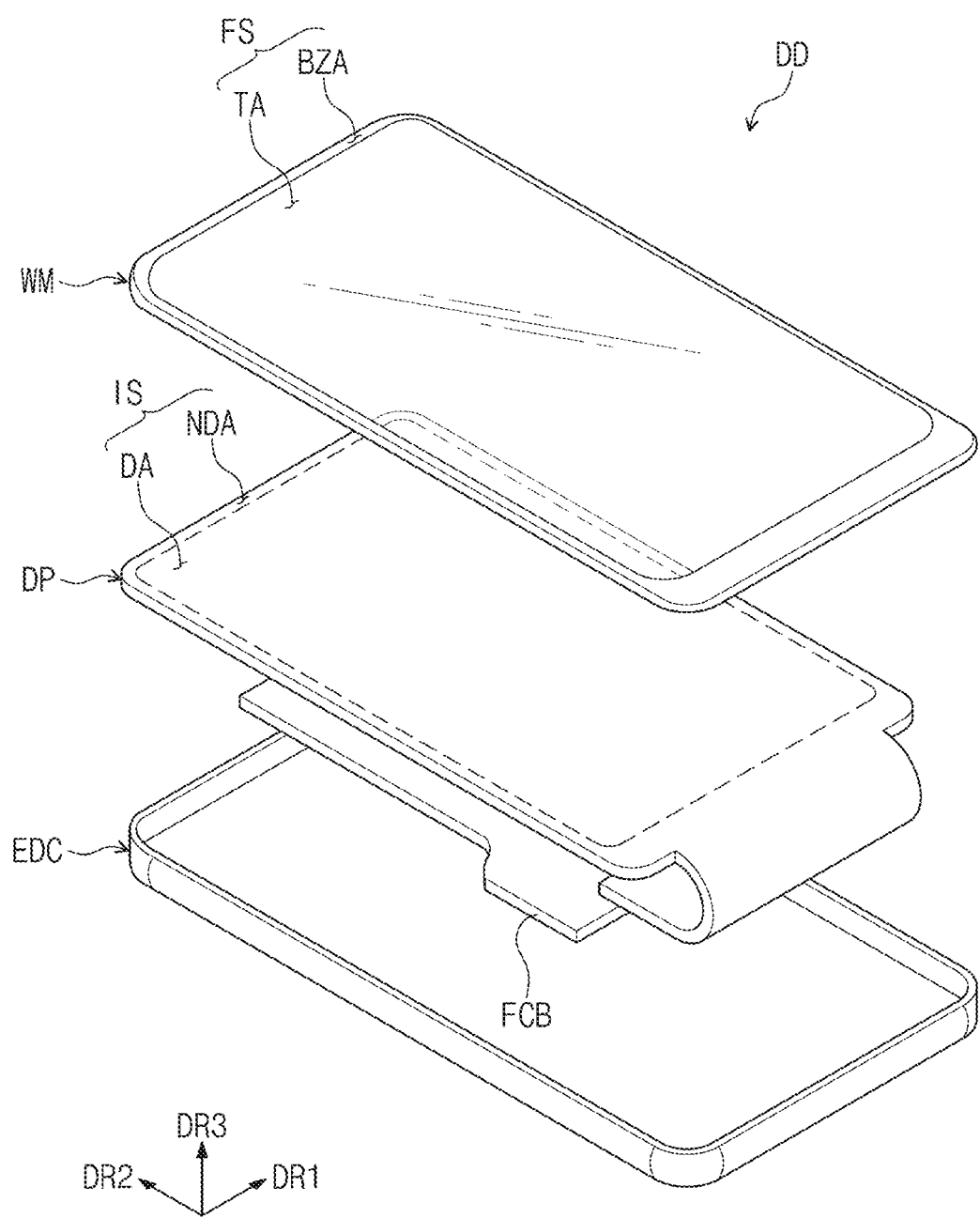
FIG. 2B is an exploded perspective view of a display device according to an embodiment of the inventive concept.

FIG. 1 is a perspective view of a display device DD according to an embodiment of the inventive concept. FIGS. 2A and 2B are exploded perspective views of the display device DD according to an embodiment of the inventive concept. FIG. 2B illustrates a state in which a display panel DP of a display device DD is bent. In this specification, the display device DD is exemplarily illustrated as a cellular phone terminal. The display device DD according to an embodiment of the inventive concept may be applied to a small- and medium-sized electronic device such as a tablet computer, a car navigation system, a game console, and a smart watch, as well as a large-sized electronic device such as a television and a monitor.

Referring to FIG. 1, the display device DD may display an image IM through a front surface FS. Icon images are exemplarily illustrated as the image IM. The front surface FS may be parallel to a plane defined by a first direction DR1 and a second direction DR2. A normal direction of the front surface FS, that is, a thickness direction of the display device DD is indicated by a third direction DR3. Hereinafter, a direction substantially perpendicular to a plane defined by the first and second directions DR1 and DR2 is defined as the third direction DR3. Also, in this specification, the wording "when viewed on a plane" may be defined as a state when viewed in the third direction DR3.

The front surface FS includes a transmission region TA in which the image IM is displayed and a bezel region BZA adjacent to the transmission region TA. The bezel region BZA is a region in which an image is not displayed. However, an embodiment of the inventive concept is not limited thereto, and the bezel region BZA may be adjacent to any one side of the transmission region TA or may be omitted.

In this specification, the wording "when viewed on a plane" or "on a plane" may mean a case when viewed in the third direction DR3. A front surface (or upper surface) and a rear surface (or lower surface) of each layer or unit to be described below are defined based on the third direction DR3. However, combinations of the first to third directions DR1, DR2, and DR3 may be changed to other combinations thereof.

Referring to FIGS. 2A and 2B, the display device DD may include a window WM, a display module DM, and an accommodation member EDC.

The window WM may be disposed on the display module DM, and transmit, to the outside, an image provided from the display module DM. The window WM may include a front surface FS. The front surface FS may correspond to the front surface FS of the display device DD illustrated in FIG. 1. The front surface FS may include a transmission region TA and a bezel region BZA. The window WM may include a base layer and functional layers disposed on the base layer. The functional layers may include a protective layer, an anti-fingerprint layer, and the like. The base layer of the window WM may be composed of glass, sapphire, plastic, or the like. The base layer of the window WM may include an optically transparent insulating material. For example, the base layer of the window WM may include glass or plastic. The base layer of the window WM may have a multi-layered structure or a single-layered structure. For example, the base layer of the window WM may include a plurality of plastic films, bonded via an adhesive agent, or may include a glass substrate and a plastic film which are bonded via an adhesive agent.

The bezel region BZA may be a region having a relatively lower light transmittance than the transmission region TA. The bezel region BZA may be defined by disposing a bezel pattern in a partial region of the base layer of the window WM, and the transmission region TA may be defined as a region in which the bezel pattern is not disposed. However, the idea of the inventive concept is not limited thereto, and the bezel region BZA may be omitted.

Although not illustrated, an anti-reflection layer may be disposed between the window WM and the display module DM. The anti-reflection layer may reduce reflectance for external light incident from the outside of the display device DD. The anti-reflection layer may include color filters. The color filters may each have a predetermined arrangement. For example, the color filters may be arranged in consideration of light-emitting color of pixels included in the display panel DP. The anti-reflection layer may further include a black matrix adjacent to the color filters.

According to an embodiment of the inventive concept, the display module DM may include the display panel DP and a driving module EM. The display module DM may include a display surface IS. The display surface IS may include a display region DA and a non-display region NDA. The display region DA may be defined as a region in which an image provided from the display module DM is displayed. The display region DA may correspond to the transmission region TA of the window WM, and the non-display region NDA may correspond to the bezel region BZA of the window WM.

The display panel DP may be any one among a liquid crystal display panel, an electrophoretic display panel, a microelectromechanical system display panel (MEMS), an electrowetting display panel, an organic light emitting display panel, an inorganic light-emitting display panel, and a quantum dot light-emitting display panel. However, the display panel DP is not particularly limited thereto. Hereinafter, the display panel DP may be described as an organic light-emitting display panel.

Although not illustrated, the display module DM may include an input sensor. The input sensor may include any one among a capacitive sensor, an optical sensor, an ultrasonic sensor, and an electromagnetic induction sensor. The input sensor may be formed on the display panel DP through a continuous process, or may be manufactured separately and then attached to an upper side of the display panel DP via an adhesive layer, but is not limited to any one embodiment.

According to the inventive concept, the display module DM may include a first region A1, a second region A2, and a third region A3 which are arranged in the second direction DR2. The first region A1 may be a region corresponding to the display region DA. The second region A2 and the third region A3 may be included in the non-display region NDA.

The driving module EM may control driving of the display module DM. The driving module EM may include a flexible circuit film FCB and a driver chip DIC. The flexible circuit film FCB may be electrically connected to the display panel DP. The flexible circuit film FCB may be coupled to an end of the third region A3 of the display module DM through a bonding process. The flexible circuit film FCB may be electrically connected to the display module DM via an anisotropic conductive adhesive layer. The driver chip DIC may be mounted on the third region A3 of the display module DM. The driver chip DIC may include driving circuits for driving pixels of the display panel DP, for example, a data driving circuit.

The driving module EM may further include a plurality of driving elements DEL mounted on the flexible circuit film FCB. A plurality of driving elements DEL may include circuit units for converting a signal input from the outside into a signal required for the driver chip DIC or into a signal required for driving the display module DM. The bent flexible circuit film FCB may be disposed below the display module DM. The flexible circuit film FCB may include a connector CNT. The connector CNT may be a connection mechanism for electrical interconnections between circuit boards. Therefore, the flexible circuit film FCB may be connected to a main board via the connector CNT and electrically connect between the display module DM and the main board. The width F_W of the flexible circuit film FCB in the first direction DR1 may be about 48 mm or less.

As shown in FIGS. 2A and 2B, the second region A2 may be a bending region which is bent with respect to a bending axis, and the first and third regions A1 and A3 may each be a non-bending region. The lengths of the second region A2 and the third region A3 in the first direction DR1 may be smaller than or equal to the length of the first region A1. A region which has a smaller length in the bending axis direction may be bent more easily. The third region A3 may be defined as a region to which the flexible circuit film FCB is connected. The third region A3 may have a width of about 20 mm or more. When the second region A2 is bent, the flexible circuit film FCB and the driver chip DIC may be bent toward a rear surface of the display panel DP, and be disposed below the rear surface of the display panel DP. Although not illustrated, additional components may be disposed to compensate for a step, caused by bending of the second region A2, between the flexible circuit film FCB and the rear surface of the display panel DP.

The accommodation member EDC may accommodate the display module DM and be coupled to the window WM. Although not illustrated, the display device DD may further include a main board, electronic modules mounted on the main board, a camera module, a power module, and the like. Hereinafter, a substrate SB illustrated in FIG. 4 may have a configuration in which the display module DM and the window WM which are illustrated in FIG. 2A are coupled.

Figure 3A:
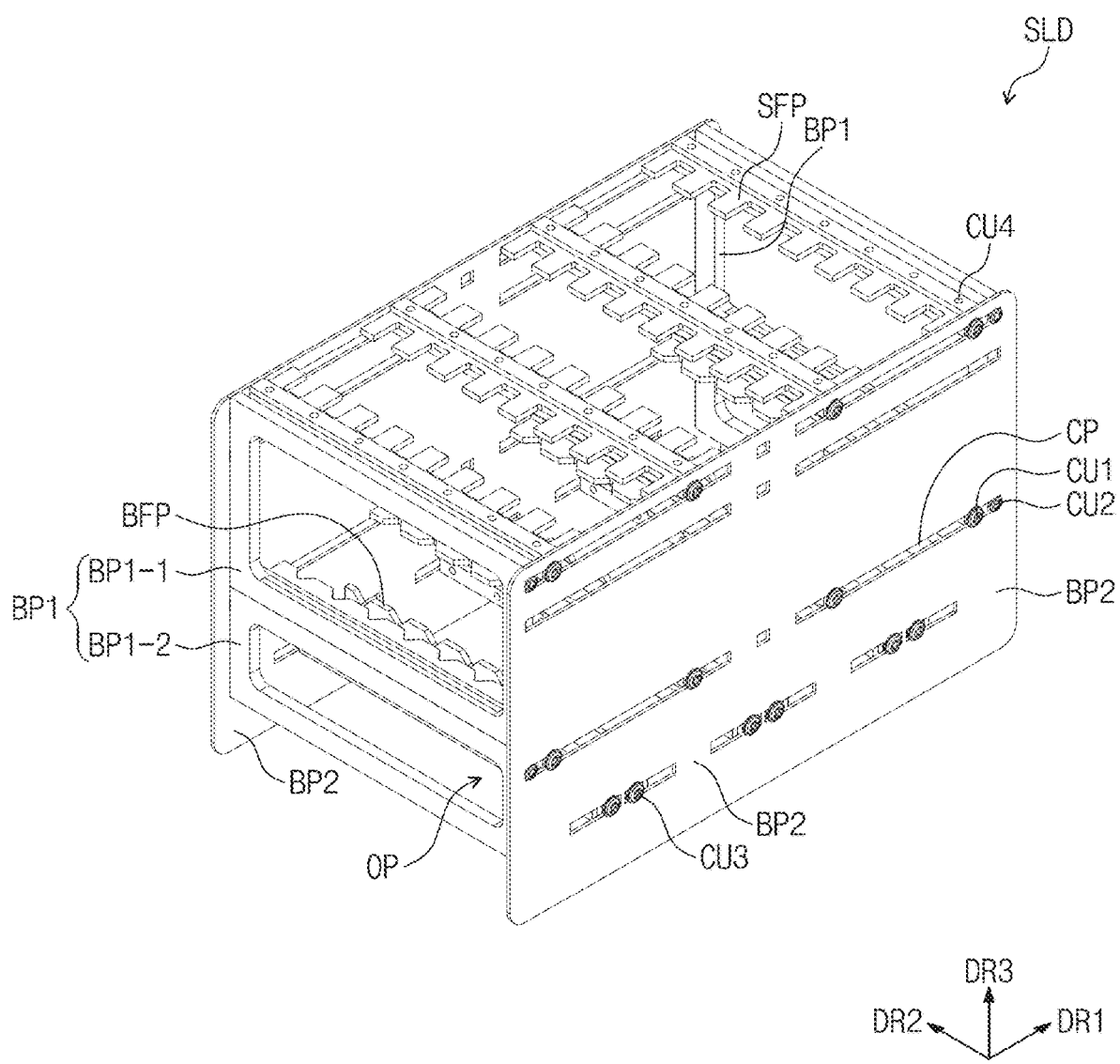
FIG. 3A is a perspective view illustrating a substrate loading device according to an embodiment of the inventive concept.
Figure 3B:
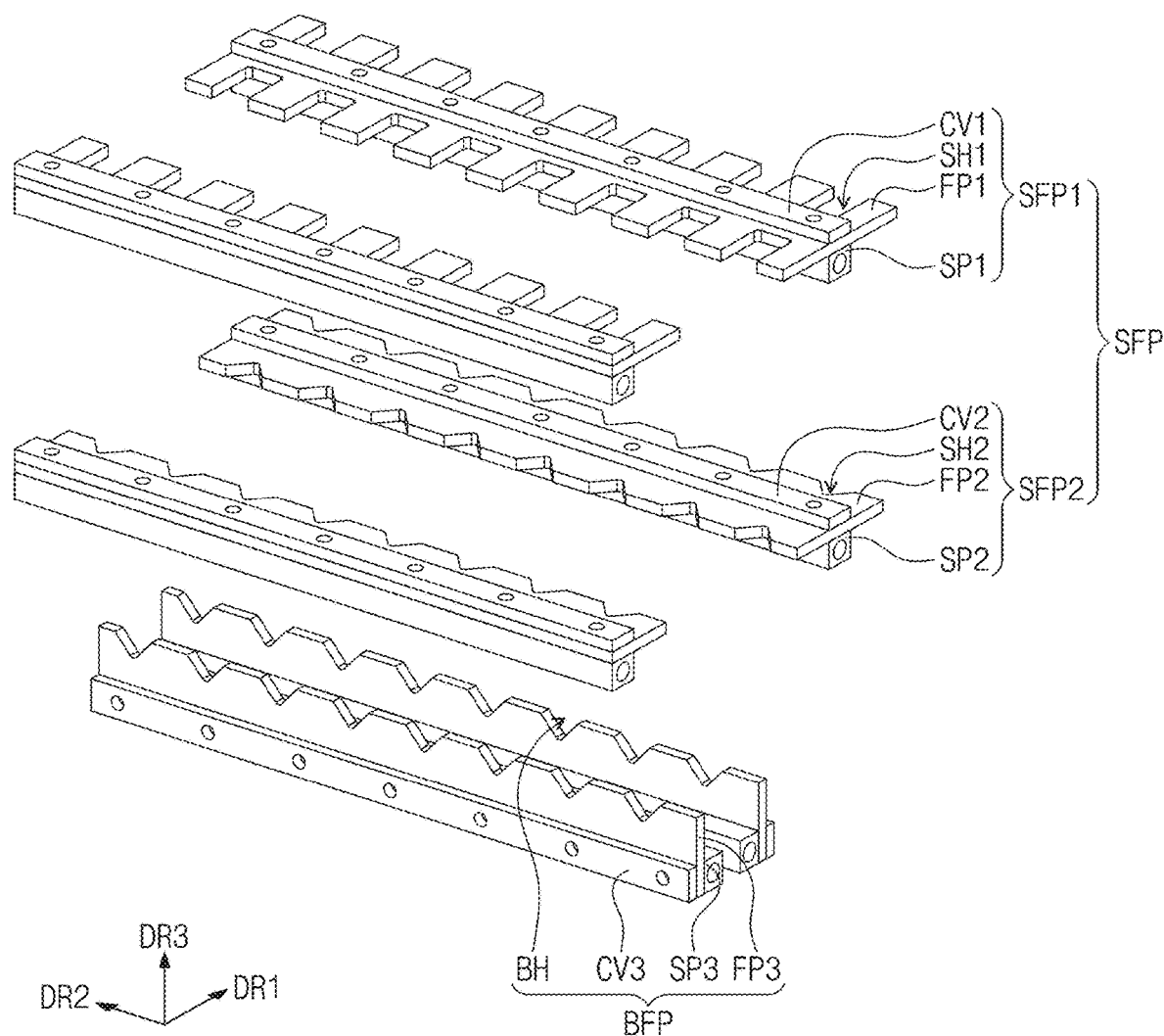
FIG. 3B is a perspective view of a portion of a substrate loading device according to an embodiment of the inventive concept.

FIG. 3A is a perspective view illustrating a substrate loading device SLD according to an embodiment of the inventive concept. FIG. 3B is a perspective view of a portion of the substrate loading device SLD according to an embodiment of the inventive concept.

Referring to FIGS. 3A and 3B, the substrate loading device SLD may include a base fixing portion BFP, a side surface fixing portion SFP, first side wall portions BP1, second side wall portions BP2, and joint units CU1, CU2, CU3, and CU4.

Referring to FIG. 3A, the first side wall portions BP1 may face each other in the first direction DR1. The second side wall portions BP2 may face each other in the second direction DR2. When viewed in the first direction DR1, the first side wall portions BP1 may each have a quadrilateral frame shape. The first side wall portions BP1 may each include two sub-side wall portions BP1-1 and BP1-2 which are arranged in the third direction DR3 and adjacent to each other, and the two sub-side wall portions BP1-1 and BP1-2 may be in contact with each other. However, this is merely illustrated as an example, and the first side wall portions BP1 may include three or more sub-side wall portions arranged in the third direction DR3. The first side wall portions BP1 may respectively have openings OP defined therein so as to check the inside of the substrate loading device SLD.

The second side wall portions BP2 may each have a flat surface defined by the first and third directions DR1 and DR3. The second side wall portions BP2 may have a plurality of joint openings defined therein. The first side wall portions BP1 may be disposed between the second side wall portions BP2 and be connected to the second side wall portions BP2.

Referring to FIGS. 3A and 3B, the side surface fixing portion SFP may be arranged between the first side wall portions BP1, and between the second side wall portions BP2. The side surface fixing portion SFP may be connected to the second side wall portions BP2. Both ends, of the side surface fixing portion SFP, opposite to each other in the second direction DR2 may be connected to the second side wall portions BP2.

A plurality of side surface fixing portion SFP may be provided. For example, the plurality of side surface fixing portions SFP may extend along the second direction DR2 and be arranged in the first direction DR1. The side surface fixing portion SFP may include a first side surface fixing portion SFP1 and a second side surface fixing portion SFP2 which are spaced apart from each other in the third direction DR3. The first side surface fixing portion SFP1 may be disposed on the second side surface fixing portion SFP2 and be spaced apart from the second side surface fixing portion SFP2 in the third direction DR3. An embodiment of the inventive concept is not limited thereto, and the side surface fixing portion SFP may be provided as a single portion or include three or more side surface fixing portions.

The first side surface fixing portion SFP1 may include a first support portion SP1, a first cover portion CV1, and a first fixing portion FP1. The first support portion SP1 may extend along the second direction DR2 and be arranged in the first direction DR1. The first fixing portion FP1 may be disposed between the first support portion SP1 and the first cover portion CV1. The two first fixing portions FP1 which are arranged in the first direction DR1 and adjacent to each other may face each other in the first direction DR1. The arrangement state of the first fixing portion FP1 may be defined as a horizontal arrangement state. First side surface grooves SH1 may be defined in mutually facing surfaces of the first fixing portion FP1, and shapes of the first side surface grooves SH1 will be described later in detail. The first side surface grooves SH1 may each be arranged with respect to the first fixing portion FP in the second direction DR2.

The second side surface fixing portion SFP2 may be disposed below the first side surface fixing portion SFP1. That is, the second side surface fixing portion SFP2 may be disposed to be spaced apart from the first side surface fixing portion SFP1 in a direction opposite to the third direction DR3. The second side surface fixing portion SFP2 may include a second support portion SP2, a second cover portion CV2, and a second fixing portion FP2. The second support portion SP2, the second cover portion CV2, and the second fixing portion FP2 may be components which respectively correspond, in the third direction DR3, to the first support portion SP1, the first cover portion CV1, and the first fixing portion FP1 of the first side surface fixing portion SFP1.

The second side surface fixing portion SFP2 may include a plurality of second side surface grooves SH2. Specifically, the second side surface grooves SH2 may be defined in mutually facing surfaces of the second fixing portions FP2, and the second side surface grooves SH2 facing each other in the first direction DR1 may be symmetrical to each other. The second side surface grooves SH2 may each have a shape recessed in the first direction DR1 or in a direction opposite to the first direction DR1.

The base fixing portion BFP may be disposed below the second side surface fixing portion SFP2, and between the first side wall portions BP1 and between the second side wall portions BP2. The base fixing portion BFP may be disposed to be spaced apart from the second side surface fixing portion SFP2 in a direction opposite to the third direction DR3. The base fixing portion BFP may extend along the second direction DR2 and be arranged in the first direction DR1. The base fixing portion BFP may be connected to the second side wall portions BP2. Both ends, of the base fixing portion BFP, opposite to each other in the second direction DR2 may be connected to the second side wall portions BP2.

The base fixing portion BFP may include a third support portion SP3, a third cover portion CV3, and a third fixing portion FP3. The third fixing portion FP3 may be disposed between the third support portion SP3 and the third cover portion CV3. The two third fixing portions FP3 which are arranged in the first direction DR1 and adjacent to each other may extend along the second direction DR2. The base grooves BH may be defined on respective surfaces of the third fixing portion FP3, and shapes of the base grooves BH will be described later in detail. The base grooves BH may each be arranged with respect to the third fixing portion FP3 in the second direction DR2.

The joint units CU1, CU2, CU3, and CU4 may include a plurality of first joint units CU1, a plurality of second joint units CU2, a plurality of third joint units CU3, and a plurality of fourth joint units CU4. The side surface fixing portions SFP may be connected to the second side wall portions BP2 via the first joint units CU1. Both ends, of the side surface fixing portions SFP, opposite to each other in the second direction DR2 may be connected to the second side wall portions BP2 via the first joint units CU1.

The first side wall portions BP1 may be connected to the second side wall portions BP2 via the second joint units CU2. Both ends, of the first side wall portions BP1, opposite to each other in the second direction DR2 may be connected to the second side wall portions BP2 via the second joint units CU2. The first and second joint units CU1 and CU2 may be connected to the side surface fixing portion SFP and the first side wall portions BP1 through joint openings CP defined in the second side wall portions BP2.

The base fixing portions BFP may be connected to the second side wall portions BP2 via the third joint units CU3. Both ends, of the base fixing portions BFP, opposite to each other in the second direction DR2 may be connected to the second side wall portions BP2 via the third joint units CU3. The fourth joint units CU4 may connect the first support portion SP1, the first cover portion CV1, and the first fixing portion FP1 which are included in each of the first side surface fixing portions SFP1.

Figure 4:
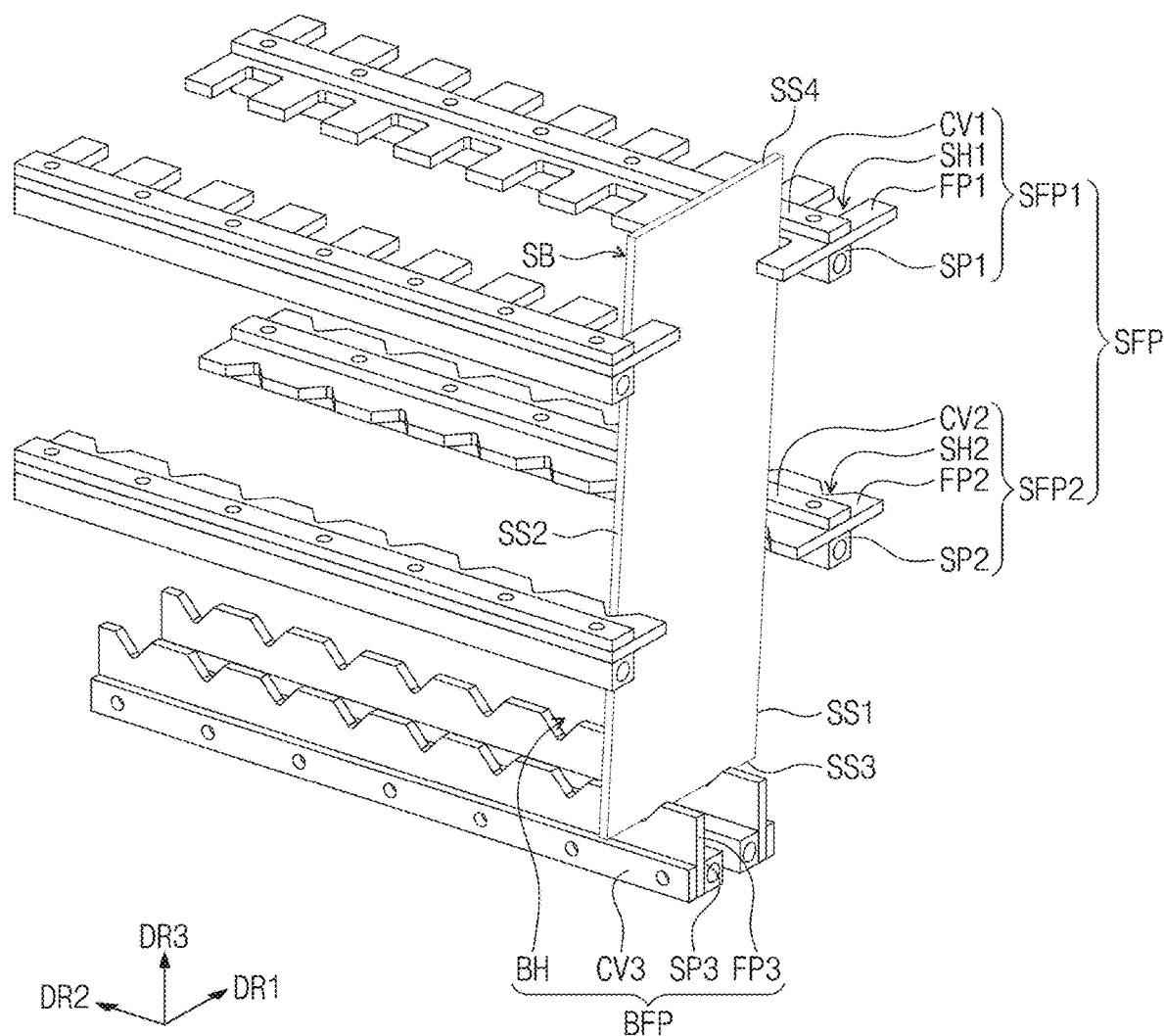
FIG. 4 is a perspective view of a portion of a substrate loading device on which a substrate is loaded.
Figure 5:
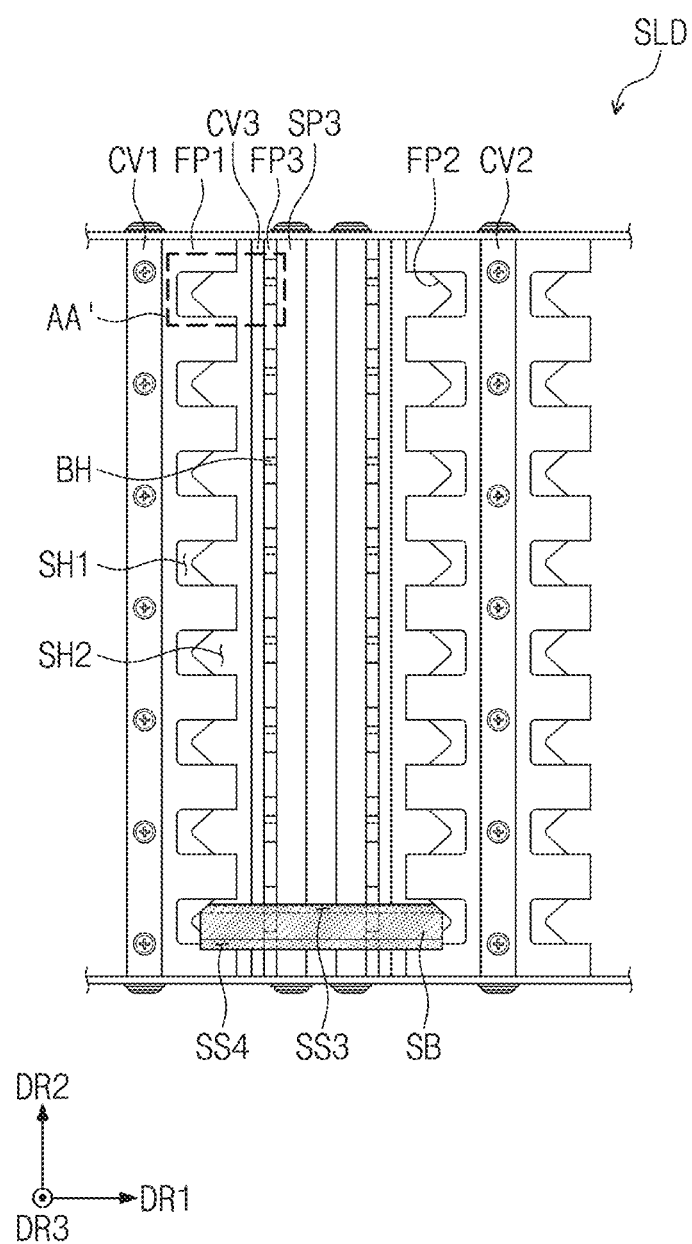
FIG. 5 is a top view of a portion of a substrate loading device on which a substrate is loaded.
Figure 6:
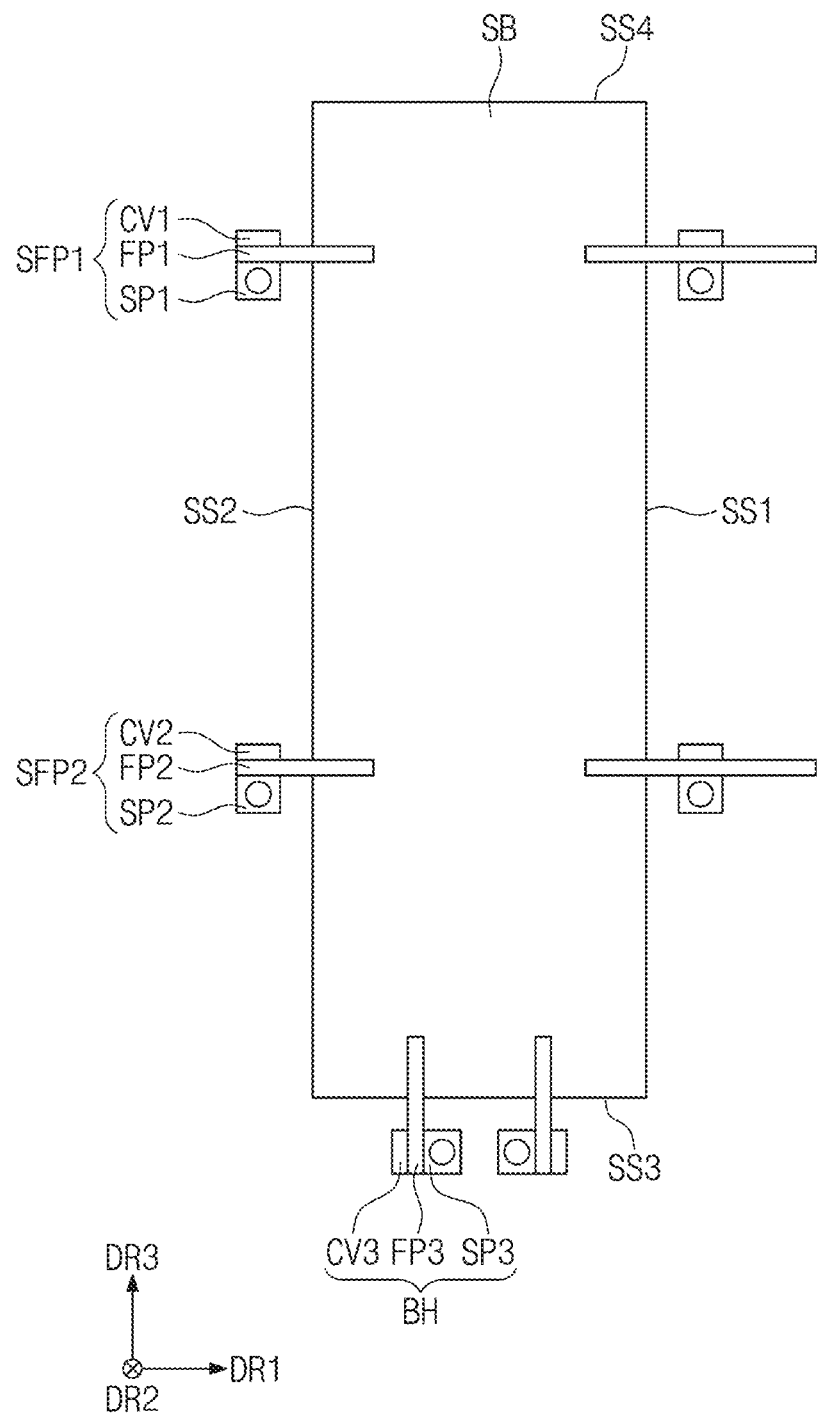
FIG. 6 is a side view of a portion of a substrate loading device on which a substrate is loaded.

FIG. 4 is a perspective view of a portion of a substrate loading device SLD on which a substrate SB is loaded. FIG. 5 is a top view of a portion of the substrate loading device SLD on which the substrate SB is loaded. FIG. 6 is a side view of a portion of the substrate loading device SLD on which the substrate SB is loaded. The substrate loading device SLD, in a state in which a single substrate SB is mounted, is exemplarily illustrated, but substantially, a plurality of substrates SB may be mounted on the substrate loading device SLD (see FIG. 3A). Hereinafter, the substrate loading device SLD according to the inventive concept will be described with reference to FIGS. 4 to 6.

The first side surface fixing portion SFP1 may include a plurality of the first side surface grooves SH1. Specifically, the first side surface grooves SH1 may be defined on mutually facing surfaces of the first fixing portions FP1, and the first side surface grooves SH1 facing each other in the first direction DR1 may be symmetrical to each other. The first side surface grooves SH1 may each have a shape recessed in the first direction DR1 or in a direction opposite to the first direction DR1.

The first side surface grooves SH1 arranged in the second direction DR2 may have the same shape and size. Referring to FIGS. 4 and 5, the first side surface grooves SH1 may each have a quadrilateral shape. Edges of the first side surface grooves SH1 may each have a rounded shape.

The second side surface fixing portion SFP2 may include a plurality of the second side surface grooves SH2. Specifically, the second side surface grooves SH2 may be defined in mutually facing surfaces of the second fixing portions FP2, and the second side surface grooves SH2 facing each other in the first direction DR1 may be symmetrical to each other. The second side surface grooves SH2 may each have a shape recessed in the first direction DR1 or a direction opposite to the first direction DR1.

Referring to FIGS. 4 and 5, the shapes of the first side surface grooves SH1 may differ from the shapes of the second side surface grooves SH2. The second side surface grooves SH2 may have triangular shapes. For example, a width of each of the second side surface grooves SH2 may become smaller the further recessed within the second side surface grooves SH2 toward the first direction DR1 or a direction opposite to the first direction DR1. In each of the second side surface grooves SH2, the innermost portion, that is, a recessed portion may include a curved surface. The second side surface grooves SH2 arranged in the second direction DR2 may have the same shape and size.

According to an embodiment of the inventive concept, the planar sizes of the first side surface grooves SH1 may differ from the planar sizes of the second side surface grooves SH2. The planar sizes of the second side surface grooves SH2 may be smaller than the planar sizes of the first side surface grooves SH1. Specifically, the recessed depths of the second side surface grooves SH2 may be smaller than the recessed depths of the first side surface grooves SH1. Also, the widths of the first side surface grooves SH1 are the same as the maximum widths of the second side surface grooves SH2 but the widths of the second side surface grooves SH2 gradually decrease toward the recessed direction, so that the planar sizes of the second side surface grooves SH2 may be smaller than the planar sizes of the first side surface grooves SH1.

Referring to FIGS. 4 to 6, the substrate SB may include first to fourth side surfaces SS1, SS2, SS3, and SS4. When viewed in the second direction DR2, the first side surface SS1 corresponds to a left side surface of the substrate SB based on the first direction DR1, and when viewed in the second direction DR2, the second side surface SS2 corresponds to a right side surface of the substrate SB based on the first direction DR1. The third side surface SS3 and the fourth side surface SS4 are surfaces connecting the first side surface SS1 to the second side surface SS2. Specifically, when viewed in the second direction DR2, the third side surface SS3 corresponds to a lower surface of the substrate SB, based on the third direction DR3, and when viewed in the second direction DR2, the fourth side surface SS4 corresponds to an upper surface of the substrate SB, based on the third direction DR3. The substrate SB may have a configuration in which the display module DM and the window WM which are illustrated in FIG. 2A are coupled.

The first side surface SS1 and the second side surface SS2 of the substrate SB may be respectively inserted into the first side surface grooves SH1 and the second side surface grooves SH2. The first side surface SS1 may be inserted into one first side surface groove SH1, corresponding to the first side surface SS1, among a plurality of first side surface grooves SH1 arranged in the second direction DR2, and into one second side surface groove SH2, corresponding to the first side surface SS1, among a plurality of second side surface grooves SH2 arranged in the second direction DR2. Also, the second side surface SS2 may be inserted into one first side surface groove SH1, corresponding to the second side surface SS2, among a plurality of first side surface grooves SH1 arranged in the second direction DR2, and into one second side surface groove SH2, corresponding to the second side surface SS2 among a plurality of second side surface grooves SH2 arranged in the second direction DR2. The first side surface SS1 and the second side surface SS2 may each not be in direct contact with a bottom surface of the first side surface groove SH1, and may each be in direct contact with a bottom surface of the second side surface groove SH2.

The third side surface SS3 of the substrate SB may be inserted into two base grooves BH adjacent to each other in the first direction DR1. The third side surface SS3 may be inserted into two base grooves BH, corresponding to the third side surface SS3, among the base grooves BH arranged in the second direction DR2. A center of each of the base grooves BH may not overlap a central axis parallel to the first direction DR1 and passing through a center of each of the first side surface grooves SH1 or the second side surface grooves SH2, into which the substrate SB is inserted. Accordingly, the substrate SB may be loaded in an inclined state. A detailed description thereof will be made later.

FIG. 4 exemplarily illustrates a single substrate SB. However, according to the above-described structure, a plurality of substrates SB may be loaded on the substrate loading device SLD (see FIG. 3A) while being inserted into the first side surface grooves SH1, the second side surface grooves SH2, and the base grooves BH. In a state where the plurality of substrates SB are loaded on the substrate loading device SLD, an autoclave process may be performed on the plurality of substrates SB.

Figure 7:
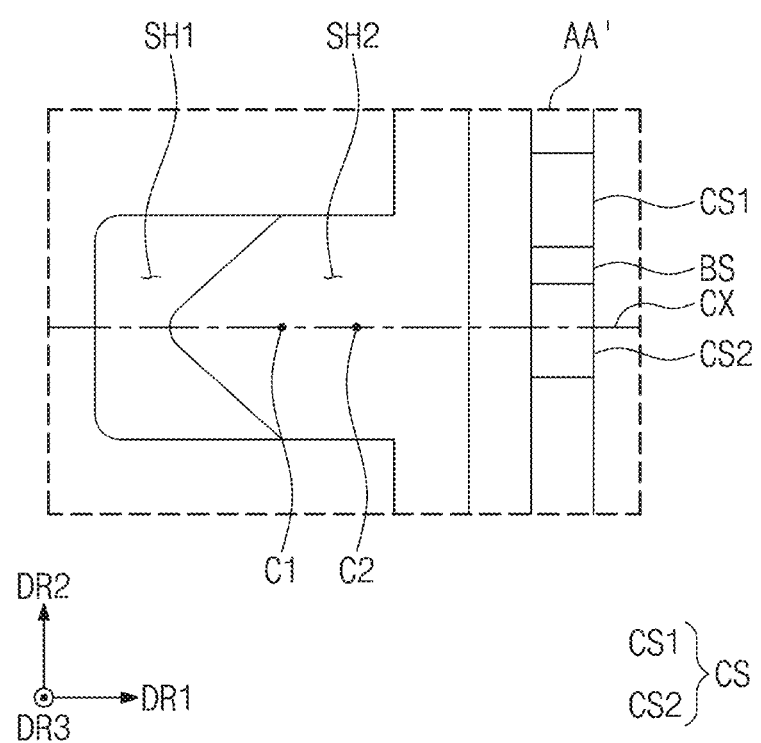
FIG. 7 is an enlarged view of an AA' region illustrated in FIG. 5.
Figure 8:
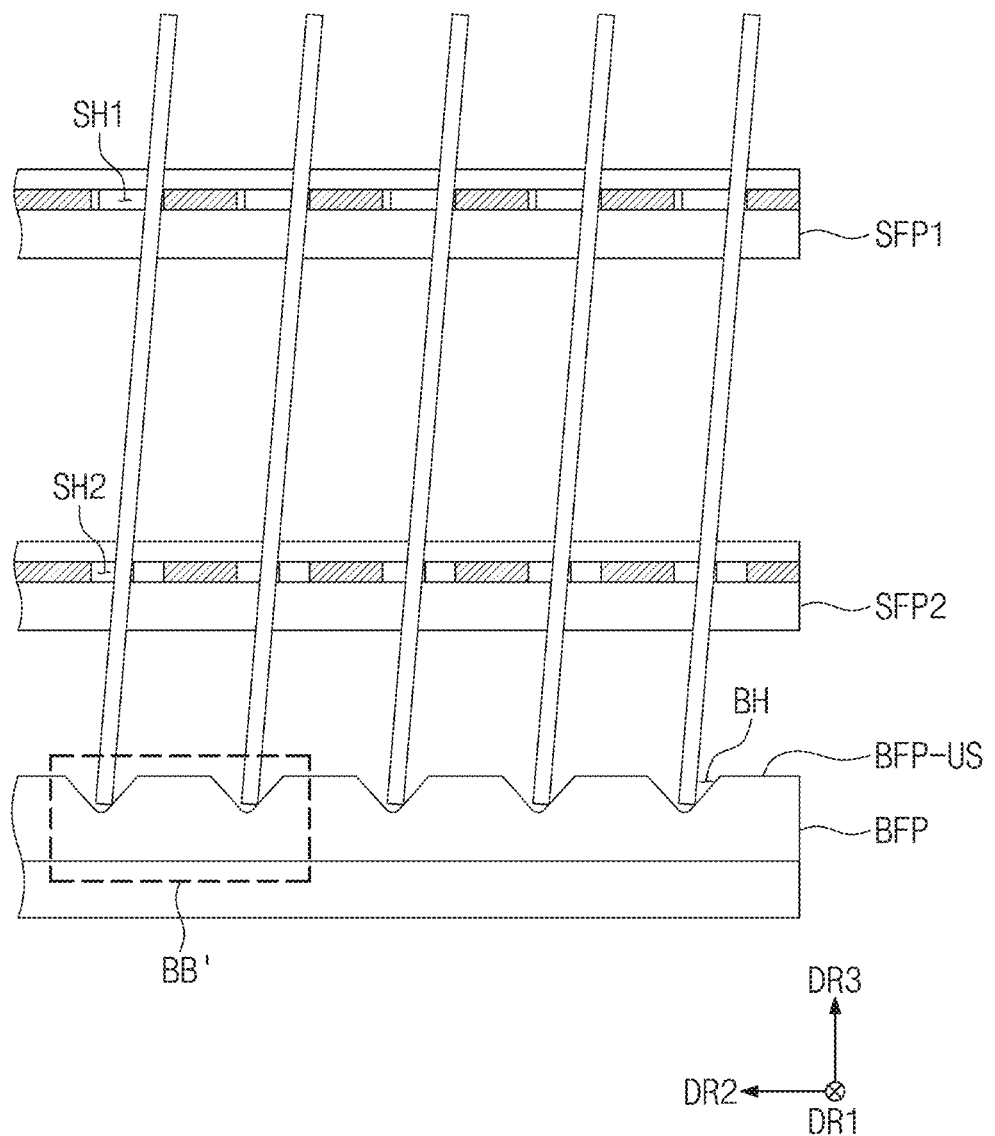
FIG. 8 is a cross-sectional view illustrating a state in which a plurality of substrates are loaded on a substrate loading device according to an embodiment of the inventive concept.
Figure 9:
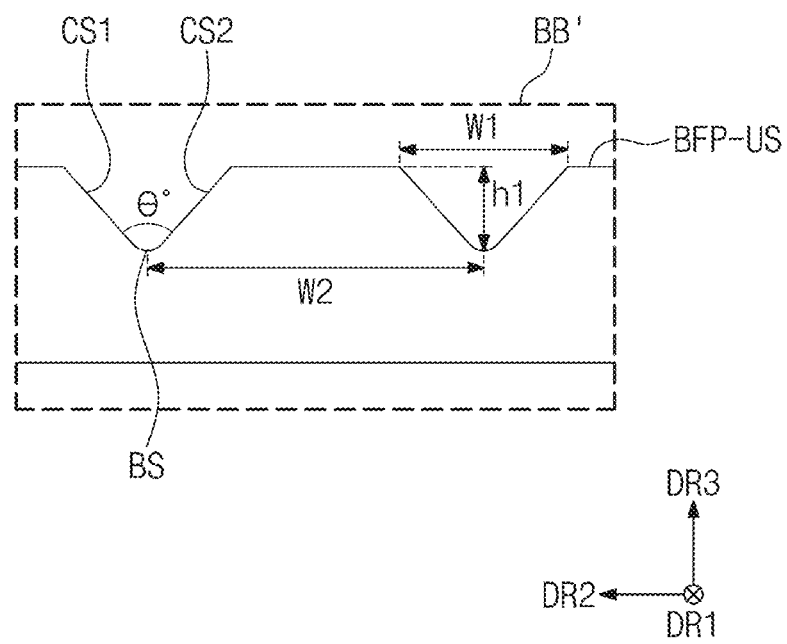
FIG. 9 is an enlarged view of a BB' region illustrated in FIG. 8.

FIG. 7 is an enlarged view of an AA' region illustrated in FIG. 5. FIG. 8 is a cross-sectional view illustrating a state in which a plurality of substrates are loaded on a substrate loading device. FIG. 9 is an enlarged view of a BB' region illustrated in FIG. 8.

Referring to FIGS. 7 to 9, a plurality of substrates SB may be loaded on a substrate loading device SLD in an inclined state. According to an embodiment of the inventive concept, at least one inclined surface CS may be defined on a base groove BH. For example, the inclined surface CS may include a first inclined surface CS1 and a second inclined surface CS2 which face each other. Also, a bottom surface BS, which connects the first inclined surface CS1 and the second inclined surface CS2 to each other, may be defined in the base groove BH. The base groove BH is a component included in the base fixing portion BFP (see FIG. 4), and the base fixing portion BFP may include the inclined surfaces CS1 and CS2 and the bottom surface BS. However, an embodiment of the inventive concept is not limited thereto, and the base groove BH may include one inclined surface and a bottom surface.

The first inclined surface CS1 and the second inclined surface CS2 may each extend from an upper surface BFP-US of the base fixing portion BFP. The first inclined surface CS1 and the second inclined surface CS2 may be symmetrical to each other with respect to the bottom surface BS. That is, the first inclined surface CS1 and the second inclined surface CS2 may have the same length, and also have the same inclined angle. According to what is illustrated, the first inclined surface CS1 and the second inclined surface CS2 each have a straight line shape, but are not limited thereto. The first inclined surface CS1 and the second inclined surface CS2 may each have a recessed curved shape.

The bottom surface BS connecting the first inclined surface CS1 to the second inclined surface CS2 may have a curved shape. For example, the bottom surface BS may have a curved shape recessed in the recessed direction of the base groove BH. However, an embodiment of the inventive concept is not limited thereto, and the bottom surface BS may include a flat surface parallel to the upper surface BFP-US of the base fixing portion BFP. Alternatively, the first inclined surface CS1 and the second inclined surface CS2 are directly connected to each other, and thus the bottom surface BS may not be formed. An angle θ between the first inclined surface CS1 and the second inclined surface CS2 may be about 60° to about 70°. For example, the angle θ between the first inclined surface CS1 and the second inclined surface CS2 may be about 64°. Also, the base groove BH may have a recessed depth h1 of about 6 mm to about 7 mm. For example, the base groove BH may have a recessed depth h1 of about 6.6 mm. Specifically, the distance between the bottom surface BS and a surface extending from the upper surface BFP-US of the base fixing portion BFP may be about 6.6 mm.

A width W1 of the base groove BH may be defined from locations at which the first inclined surface CS1 and the second inclined surface CS2 are respectively formed. A distance between a location, at which the first inclined surface CS1 is formed by extending from the upper surface BFP-US of the base fixing portion BFP, and a location, at which the second inclined surface CS2 is formed by extending from the upper surface BFP-US of the base fixing portion BFP, may be defined as the width W1 of the base groove BH. The base groove BH may have a width W1 of about 10 mm or more. For example, the base groove BH may have a width W1 of about 10 mm to about 20 mm.

The base grooves BH are arranged along the second direction DR2, and the width (or pitch) W2 between two base grooves BH adjacent to each other among the base grooves BH arranged along the second direction DR2 may be about 20 mm or more. For example, the distance between centers of two base grooves BH adjacent to each other in the second direction DR2, that is, the pitch W2 may be about 20 mm to about 40 mm.

A center portion may be defined in each of the side surface grooves SH1 and SH2. A first center C1 may be defined in the first side surface groove SH1, and a second center C2 may be defined in the second side surface groove SH2. The first center C1 may be located in the middle in the second direction DR2 with respect to the first side surface groove SH1. The second center C2 may be located in the middle in the second direction DR2 with respect to the second side surface groove SH2. According to an embodiment of the inventive concept, a central axis CX passing through the first center C1 or the second center C2 may be defined in each of the side surface grooves SH1 and SH2. When viewed in the third direction DR3, the central axis CX may pass through the first center C1 or the second center C2, and be parallel to the first direction DR1. According to an embodiment of the inventive concept, when viewed in the third direction DR3, the central axis CX may overlap the second inclined surface CS2 on a plane, and may not overlap the bottom surface BS on a plane.

Referring to FIGS. 7 and 8, the base fixing portion BFP may be disposed such that the central axis CX overlaps the second inclined surface CS2 on a plane. The substrates SB are inserted into the substrate loading device SLD, and may move in a direction opposite to the third direction DR3. The substrates SB may pass through the first side surface groove SH1 and the second side surface groove SH2, and be inserted into the base grooves BH during insertion of the substrates SB into the substrate loading device SLD. In this case, the substrates SB may pass through the central axis CX, and be inserted into the base grooves BH. The substrates SB are in contact with the second inclined surface CS2 overlapping the central axis CX of the base groove BH on a plane, and when lower surfaces of the substrates SB (or the third side surface SS3, see FIG. 4) are in contact with the second inclined surface CS2, the substrates SB may slide down in the recessed direction of the base grooves BH. Accordingly, the substrates SB may each be loaded on the substrate loading device SLD, according to the inventive concept, in a state where all the substrates SB are inclined in the same direction. For example, the substrates SB may each be loaded on the substrate loading device SLD, according to the inventive concept, in a state of being inclined in a direction opposite to the second direction DR2. When the substrates SB include the long-length flexible circuit films FCB illustrated in FIG. 3A, the flexible circuit films FCB may be loaded on the substrate loading device SLD in a state of being inclined in the same direction. Therefore, the flexible circuit films FCB included in the substrates SB adjacent to each other may not be in contact with each other, thereby preventing a defect, such as a crack, caused by mutual contacts of the flexible circuit films FCB.

Figure 10A:
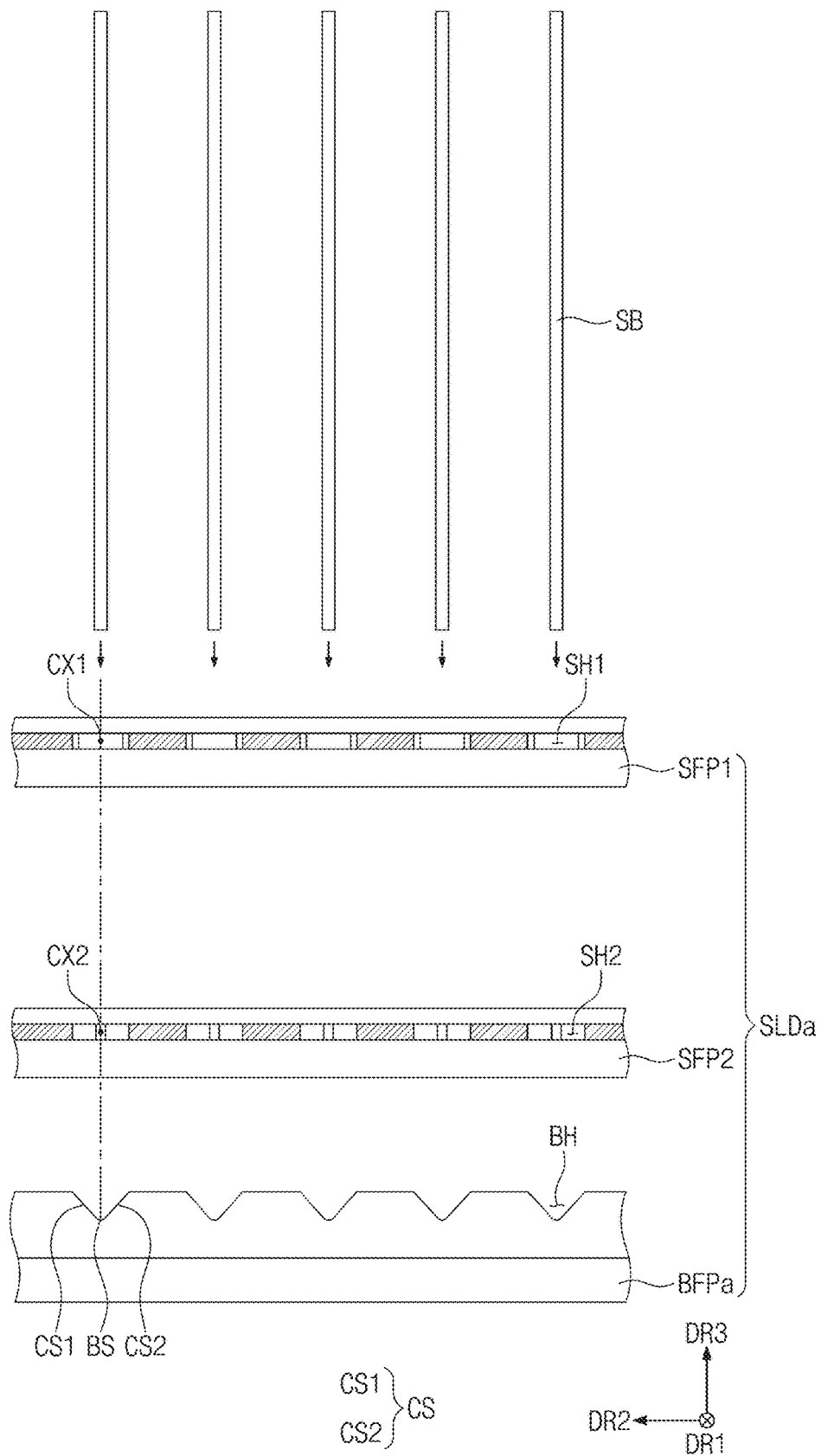
FIGS. 10A, 10B, and 10C are views illustrating a substrate loading method according to an embodiment of the inventive concept.
Figure 10B:
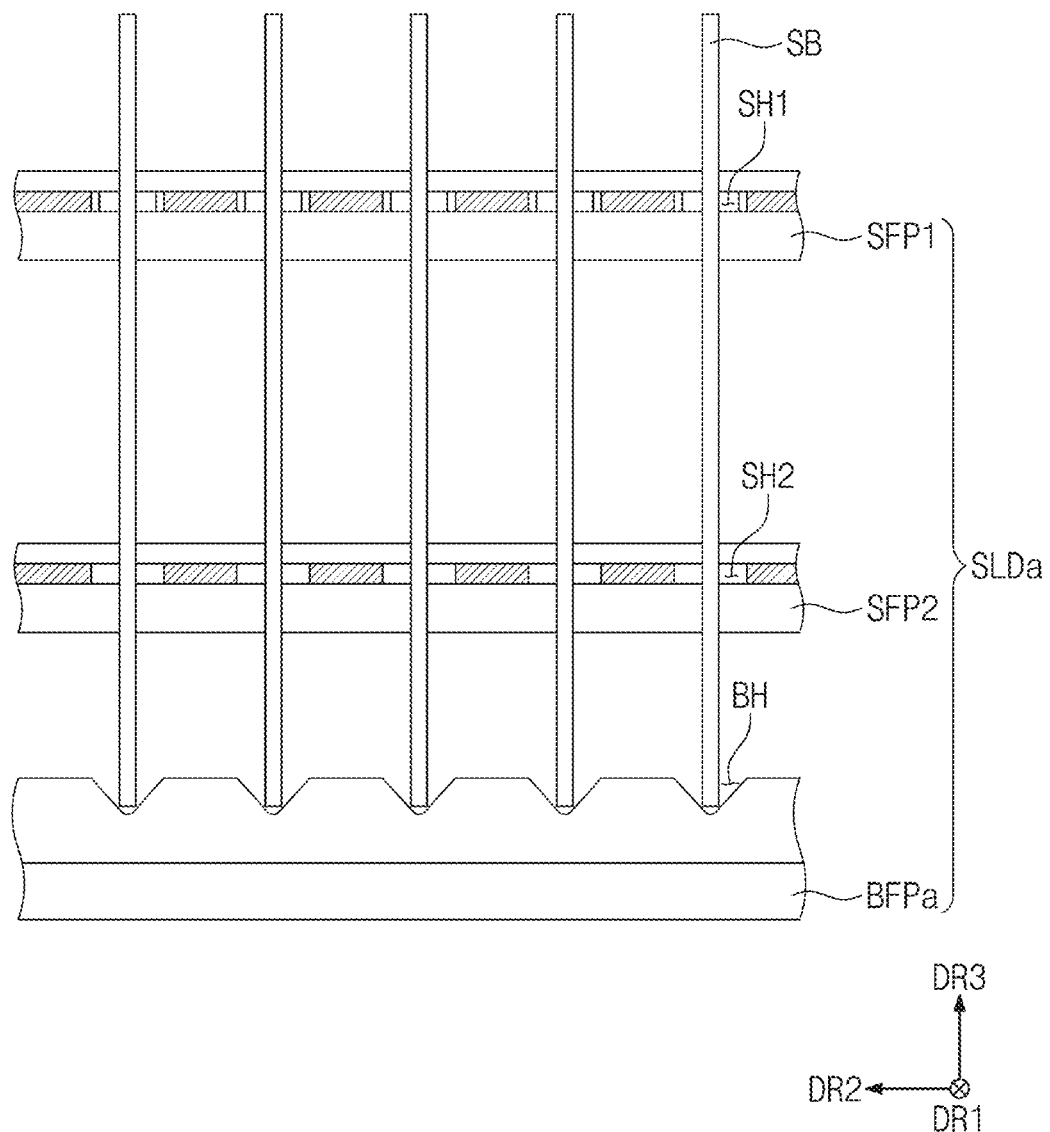
Figure 10C:
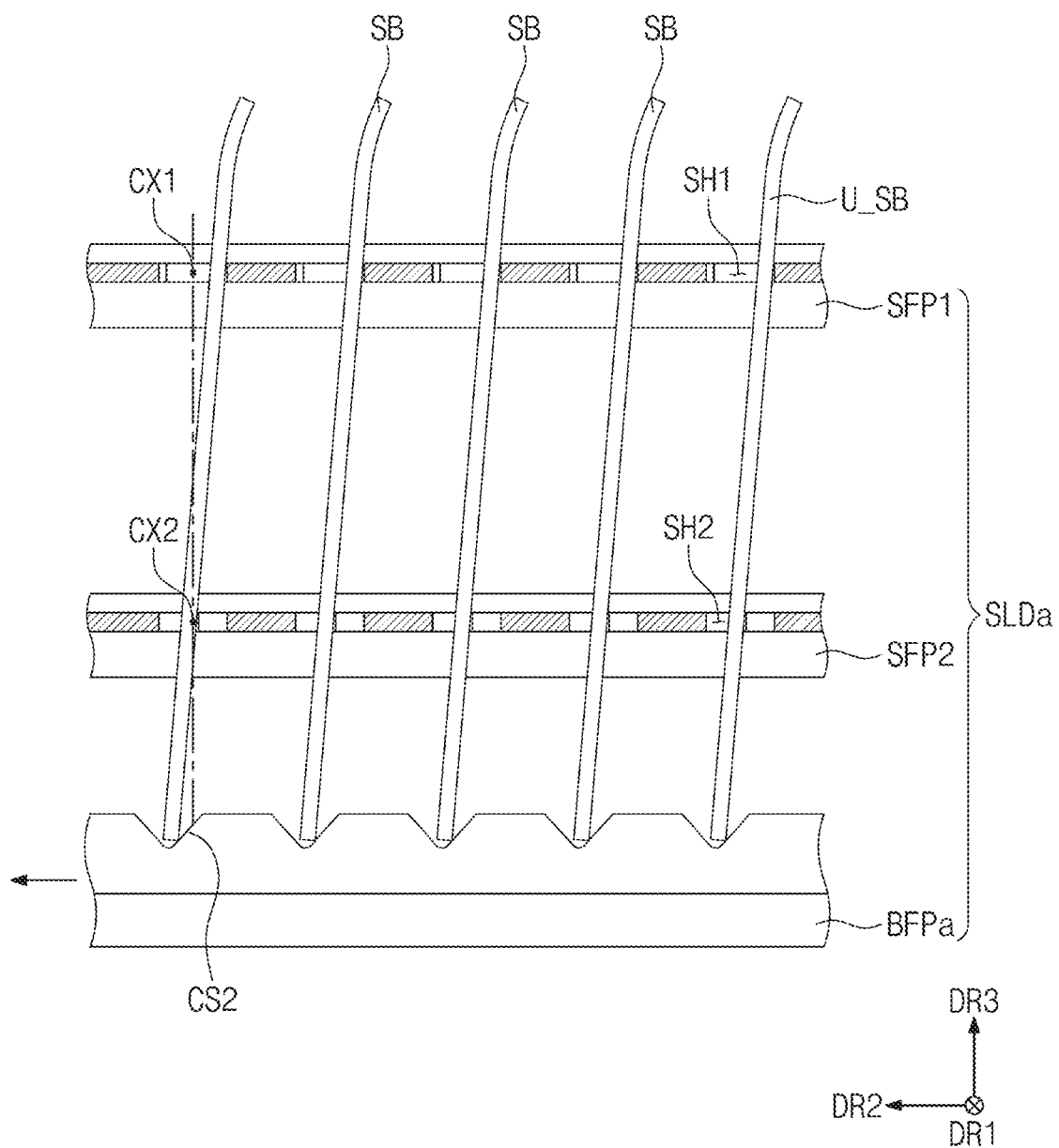

FIGS. 10A to 10C are views illustrating a substrate loading method according to an embodiment of the inventive concept. A method through which a plurality of substrates SB are loaded on a substrate loading device SLDa will be described with reference to FIGS. 10A to 10C.

Referring to FIG. 10A, a base fixing portion BFPa may be provided. The base fixing portion BFPa may include a base groove BH in which at least one inclined surface CS is defined. The base fixing portion BFPa has the same configuration as the base fixing portion BFP illustrated in FIG. 4. However, although the base fixing portion BFP is immovable, the base fixing portion BFPa may move in the second direction DR2 or in a direction opposite to the second direction DR2.

Side surface fixing portions SFP1 and SFP2 may be disposed on the base fixing portion BFPa. For example, the second side surface fixing portion SFP2 may be disposed on the base fixing portion BFPa, and the first side surface fixing portion SFP1 may be disposed on the second side surface fixing portion SFP2. The first side surface fixing portion SFP1 may be disposed to be spaced apart from the second side surface fixing portion SFP2 in the third direction DR3. The second side surface fixing portion SFP2 may be disposed to be spaced apart from the base fixing portion BFPa in the third direction DR3.

The first side surface fixing portion SFP1 may include first side surface grooves SH1 into which the substrates SB are inserted, and the second side surface fixing portion SFP2 may include second side surface grooves SH2 into which the substrates SB are inserted. A first central axis CX1 may be defined in each of the first side surface grooves SH1. The first central axis CX1 may be an axis passing through the first center C1, illustrated in FIG. 7, and parallel to the first direction DR1. A second central axis CX2 may be defined in the second side surface grooves SH2. The second central axis CX2 may be an axis passing through the second center C2 and parallel to the first direction DR1. The first central axis CX1 may overlap the second central axis CX2 in the third direction DR3. According to an embodiment of the inventive concept, the first central axis CX1 and the second central axis CX2 may overlap the bottom surface BS on a plane and may not overlap the inclined surface CS. The first central axis CX1 and the second central axis CX2 may be aligned in a row with a center of the bottom surface BS in the third direction DR3.

The base groove BH may be provided in plurality. The plurality of base grooves BH may be arranged along the second direction DR2. The substrate SB may be provided in plurality to correspond to the plurality of base grooves BH.

Referring to FIGS. 10A and 10B, the substrates SB may be inserted into the substrate loading device SLDa on the first side surface fixing portion SFP1. The substrates SB may be moved, through an additional moving device, in a direction opposite to the third direction DR3 in which the substrate loading device SLDa is disposed, and then may be inserted into the substrate loading device SLDa. The substrates SB may move each in a direction opposite to the third direction DR3 and be inserted into the first side surface groove SH1 and the second side surface groove SH2. Thereafter, the substrates SB may be inserted into the base grooves BH and be in contact with bottom surfaces BS of the base grooves BH.

According to an embodiment of the inventive concept, the length of each of the substrates SB in the third direction DR3 may be greater than the distance by which the first side surface fixing portion SFP1 and the base fixing portion BFPa are spaced apart from each other in the third direction DR3. Accordingly, when the substrates SB are loaded on the substrate loading device SLDa, a portion of the substrate loading device SLDa may be exposed to the outside. Therefore, a portion, of the substrate SB, exposed to the outside of the substrate loading device SLDa, that is, a portion disposed on the first side surface fixing portion SFP1 may be defined as an upper side portion U_SB (see FIG. 10C).

Referring to FIG. 10C, the base fixing portion BFPa may move in the second direction DR2. As the base fixing portion BFPa moves in the second direction DR2, the first central axis CX1 and the second central axis CX2 may overlap the second inclined surface CS2. As the base fixing portion BFPa moves in the second direction DR2, a lower portion of each of the substrates SB inserted into the base groove BH may also move in the second direction DR2. Since a portion, of the substrate SB, inserted into the first side surface groove SH1 and the second side surface groove SH2 may be fixed, and a lower portion of each of the substrates SB inserted into the base groove BH moves in the second direction DR2, all the substrates SB may be inclined in the same direction, that is, a direction opposite to the second direction DR2.

When the substrates SB each include the long-length flexible circuit film FCB illustrated in FIG. 3A, the upper side portion U_SB of each of the substrates SB may include the flexible circuit film FCB. The flexible circuit film FCB may be inclined in a direction opposite to the second direction DR2 on the substrate loading device SLDa. Therefore, the flexible circuit films FCB included in the substrates SB adjacent to each other may not be in contact with each other, thereby preventing a defect, such as a crack, caused by mutual contacts of the flexible circuit films FCB.

A substrate loading device according to the inventive concept may include a side surface fixing portion including a side surface groove which may fix a substrate and a base fixing portion including a base groove. Since a central axis defined in the side surface groove overlaps an inclined surface defined in the base groove, substrates included in the substrate loading device may be disposed while being inclined in the same direction. Therefore, adjacent substrates may not be in contact with each other, thereby preventing a defect, such as a crack, caused by mutual contacts of substrates.

Although the embodiments of the inventive concept have been described, it is understood that the inventive concept should not be limited to these embodiments but various changes and modifications can be made by one ordinary skilled in the art within the spirit and scope of the inventive concept as hereinafter claimed.

Therefore, the technical scope of the inventive concept is not limited to the contents described in the detailed description of the specification, but should be determined by the claims.

What is claimed is:

1. A substrate loading device, comprising:
   a side surface fixing portion including side surface grooves into which first and second side surfaces, opposite to each other in a first direction, of a substrate are inserted, and extending in a second direction crossing the first direction; and
   a base fixing portion including a base groove into which a third side surface of the substrate, connecting the first side surface to the second side surface, is inserted,
   wherein the base fixing portion includes at least one inclined surface defining the base groove, and
   the inclined surface overlaps, on a plane, a central axis passing through centers of the side surface grooves and parallel to the first direction.

2. The substrate loading device of claim 1, wherein the inclined surface comprises first and second inclined surfaces facing each other.

3. The substrate loading device of claim 2, wherein the base fixing portion further comprises a bottom surface which connects the first inclined surface and the second inclined surface to each other.

4. The substrate loading device of claim 3, wherein the bottom surface has a curved shape recessed toward a recessed direction of the base groove.

5. The substrate loading device of claim 3, wherein a gap between the first inclined surface and the second inclined surface becomes smaller as a distance to the bottom surface becomes less.

6. The substrate loading device of claim 3, wherein the central axis does not overlap the bottom surface on a plane.

7. The substrate loading device of claim 3, wherein the third side surface of the substrate is in contact with the bottom surface.

8. The substrate loading device of claim 1, further comprising a plurality of base grooves comprising the base groove, and
the plurality of base grooves are arranged along the second direction.

9. The substrate loading device of claim 1, further comprising a plurality of side surface fixing portions comprising the side surface fixing portion.

10. The substrate loading device of claim 9, wherein the plurality of side surface fixing portions comprise:
a first side surface fixing portion arranged toward the base fixing portion; and
a second side surface fixing portion disposed between the first side surface fixing portion and the base fixing portion.

11. The substrate loading device of claim 10, wherein the first side surface fixing portion comprises first side surface grooves into which the first side surface and the second side surface of the substrate are respectively inserted, and
the second side surface fixing portion comprises second side surface grooves into which the first side surface and the second side surface of the substrate are respectively inserted.

12. The substrate loading device of claim 11, wherein planar shapes of the first side surface grooves differ from planar shapes of the second side surface grooves.

13. The substrate loading device of claim 12, wherein planar sizes of the first side surface grooves are greater than planar sizes of the second side surface grooves.

14. The substrate loading device of claim 10, wherein the first side surface fixing portion, the second side surface fixing portion, and the base fixing portion are disposed to be spaced apart from each other.

15. A substrate loading method comprising:
disposing a base fixing portion including a base groove comprising at least one inclined surface;
disposing, on the base fixing portion, a side surface fixing portion including side surface grooves such that a central axis, passing through centers of the side surface grooves and parallel to a first direction, does not overlap the inclined surface on a plane; and
inserting first and second side surfaces of a substrate into the side surface grooves by moving the substrate along a third direction perpendicular to the first direction, the first and second side surfaces being opposite to each other in the first direction;
inserting, into the base groove, a third side surface of the substrate connecting the first side surface to the second side surface by moving the substrate along the third direction; and
moving the base fixing portion in a second direction crossing a plane defined by the first and third directions such that the central axis overlaps the inclined surface on a plane.

16. The substrate loading method of claim 15, wherein the base fixing portion comprises a plurality of base grooves comprising the base groove, and
a plurality of substrates comprising the substrate are provided to correspond to the plurality of base grooves.

17. The substrate loading method of claim 16, wherein the substrates are respectively inserted into the plurality of base grooves arranged along the second direction.

18. The substrate loading method of claim 17, wherein after moving the base fixing portion in the second direction, the substrates are inclined in a direction opposite to the second direction.

19. The substrate loading method of claim 18, wherein the side surface fixing portion and the base fixing portion are spaced apart from each other in the third direction.

20. The substrate loading method of claim 19, wherein a length of each of the substrates in the third direction is greater than a distance by which the side surface fixing portion and the base fixing portion is spaced apart from each other in the third direction, and
upper side portions of the substrates arranged on the side surface fixing portion are inclined to a direction opposite to the second direction.

* * * * *